(12) United States Patent
Wei (10) Patent No.: US 8,964,117 B2
(45) Date of Patent: Feb. 24, 2015

(54) SINGLE-PASS MOTION ADAPTIVE DEINTERLACER AND METHOD THEREFORE

(75) Inventor: Jeff X. Wei, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 1853 days.

(21) Appl. No.: 11/863,786

(22) Filed: Sep. 28, 2007

(65) Prior Publication Data

US 2009/0086093 A1 Apr. 2, 2009

(51) Int. Cl.
*H04N 7/01* (2006.01)
*H04N 5/14* (2006.01)

(52) U.S. Cl.
CPC ............. *H04N 5/144* (2013.01); *H04N 7/012* (2013.01)
USPC ............................ 348/452; 348/448; 348/458

(58) Field of Classification Search
CPC .................... H04N 7/01–7/0147; H04N 11/20
USPC .................................................. 348/448–452
See application file for complete search history.

(56) References Cited

U.S. PATENT DOCUMENTS

| | | | |
|---|---|---|---|
| 4,472,732 A | 9/1984 | Bennett et al. |
| 4,631,750 A | 12/1986 | Gabriel et al. |
| 4,669,100 A | 5/1987 | Slotboom et al. |
| 4,680,628 A | 7/1987 | Wojcik et al. |
| 4,740,842 A | 4/1988 | Annegarn et al. |
| 4,750,057 A | 6/1988 | Baumeister |
| 4,800,436 A | 1/1989 | Polaert et al. |
| 4,868,655 A | 9/1989 | Choquet et al. |
| 4,881,125 A | 11/1989 | Krause |
| 4,908,874 A | 3/1990 | Gabriel |
| 4,941,045 A | 7/1990 | Birch |
| 4,947,251 A | 8/1990 | Hentschel |
| 4,982,280 A | 1/1991 | Lyon et al. |
| 4,989,090 A | 1/1991 | Campbell et al. |
| 4,992,982 A | 2/1991 | Steenhof |

(Continued)

FOREIGN PATENT DOCUMENTS

| | | |
|---|---|---|
| EP | 0690617 A2 | 1/1996 |
| EP | 0739129 A2 | 10/1996 |

(Continued)

OTHER PUBLICATIONS

Le Gall; Compression Standard for Multimedia Applications; Association for Computing Machinery; vol. 34, No. 4; pp. 47-58, Apr. 1991.

(Continued)

*Primary Examiner* — Michael Lee
(74) *Attorney, Agent, or Firm* — Faegre Baker Daniels LLP (57) ABSTRACT

A frame construction engine constructs a first frame of deinterlaced video and a second frame of deinterlaced video based on a first field of interlaced video and based on a second field of interlaced video, independent of any other fields of interlaced video. The frame construction engine constructs the first frame of deinterlaced video by assigning pixel values from the first field of interlaced video to corresponding pixel locations in the first frame. The frame construction engine constructs the second frame of deinterlaced video by assigning pixel values from the second field of interlaced video to corresponding pixel locations in the second frame. Missing pixel locations in each of the frames are selected from a corresponding field of spatially interpolated pixel values or from an opposite field of deinterlaced video.

15 Claims, 5 Drawing Sheets

(56) References Cited

U.S. PATENT DOCUMENTS

| | | | |
|---|---|---|---|
| 4,998,153 A | 3/1991 | Kuyk et al. | |
| 5,014,119 A | 5/1991 | Faroudja | |
| 5,046,164 A | 9/1991 | Hurst, Jr. | |
| 5,055,927 A | 10/1991 | Keesen et al. | |
| 5,101,403 A | 3/1992 | Balzano | |
| 5,128,791 A | 7/1992 | LeGall et al. | |
| 5,134,480 A | 7/1992 | Wang et al. | |
| 5,144,429 A | 9/1992 | Haghiri et al. | |
| 5,151,783 A | 9/1992 | Faroudja | |
| 5,159,451 A | 10/1992 | Faroudja et al. | |
| 5,191,576 A | 3/1993 | Pommier et al. | |
| 5,193,004 A | 3/1993 | Wang et al. | |
| 5,233,421 A | 8/1993 | Christopher | |
| 5,237,414 A | 8/1993 | Faroudja | |
| 5,289,305 A | 2/1994 | Lake, Jr. | |
| 5,305,104 A | 4/1994 | Jensen et al. | |
| 5,327,240 A | 7/1994 | Golston et al. | |
| 5,351,083 A | 9/1994 | Tsukagoshi | |
| 5,408,270 A | 4/1995 | Lim | |
| 5,428,398 A | 6/1995 | Faroudja | |
| 5,436,663 A | 7/1995 | Guede | |
| 5,467,138 A | 11/1995 | Gove | |
| 5,488,419 A | 1/1996 | Hui et al. | |
| 5,488,421 A | 1/1996 | Hwang et al. | |
| 5,508,746 A | 4/1996 | Lim | |
| 5,517,247 A | 5/1996 | Correa et al. | |
| 5,521,644 A | 5/1996 | Sezan et al. | |
| 5,532,750 A | 7/1996 | De Haan et al. | |
| 5,596,371 A | 1/1997 | Pakhchyan et al. | |
| 5,600,731 A | 2/1997 | Sezan et al. | |
| 5,602,654 A * | 2/1997 | Patti et al. | 358/461 |
| 5,619,272 A | 4/1997 | Salmon et al. | |
| 5,621,470 A | 4/1997 | Sid-Ahmed | |
| 5,621,481 A | 4/1997 | Yasuda et al. | |
| 5,627,555 A | 5/1997 | den Hollander | |
| 5,661,525 A | 8/1997 | Kovacevic et al. | |
| 5,682,205 A * | 10/1997 | Sezan et al. | 348/452 |
| 5,689,305 A | 11/1997 | Ng et al. | |
| 5,724,098 A | 3/1998 | Murakami et al. | |
| 5,754,248 A | 5/1998 | Faroudja | |
| 5,774,593 A | 6/1998 | Zick et al. | |
| 5,784,115 A | 7/1998 | Bozdagi | |
| 5,793,435 A | 8/1998 | Ward et al. | |
| 5,844,614 A | 12/1998 | Chong et al. | |
| 5,864,369 A | 1/1999 | Swan | |
| 5,929,913 A | 7/1999 | Etoh | |
| 5,936,670 A | 8/1999 | Frencken | |
| 5,943,099 A | 8/1999 | Kim | |
| 5,995,154 A | 11/1999 | Heimburger | |
| 6,037,986 A | 3/2000 | Zhang et al. | |
| 6,118,486 A | 9/2000 | Reitmeier | |
| 6,118,488 A | 9/2000 | Huang | |
| 6,121,978 A | 9/2000 | Miler | |
| 6,141,056 A | 10/2000 | Westerman | |
| 6,188,437 B1 | 2/2001 | Webb et al. | |
| 6,208,350 B1 | 3/2001 | Herrera | |
| 6,239,842 B1 | 5/2001 | Segman | |
| 6,266,092 B1 | 7/2001 | Wang et al. | |
| 6,330,032 B1 | 12/2001 | Boehlke | |
| 6,340,990 B1 | 1/2002 | Wilson | |
| 6,370,198 B1 | 4/2002 | Washino | |
| 6,392,706 B1 | 5/2002 | Sugiyama | |
| 6,414,719 B1 | 7/2002 | Parikh | |
| 6,437,828 B1 | 8/2002 | Chambers et al. | |
| 6,456,329 B1 | 9/2002 | Tinker et al. | |
| 6,459,454 B1 | 10/2002 | Walters | |
| 6,459,455 B1 | 10/2002 | Jiang et al. | |
| 6,473,460 B1 | 10/2002 | Topper | |
| 6,487,304 B1 | 11/2002 | Szeliski | |
| 6,549,240 B1 | 4/2003 | Reitmeier | |
| 6,570,624 B2 | 5/2003 | Corong et al. | |
| 6,618,094 B1 * | 9/2003 | De Haan et al. | 348/448 |
| 6,690,427 B2 | 2/2004 | Swan | |
| 6,970,206 B1 | 11/2005 | Swan et al. | |
| 7,218,355 B2 | 5/2007 | Zhou et al. | |
| 7,256,835 B2 * | 8/2007 | Jiang et al. | 348/448 |
| 2002/0054236 A1 | 5/2002 | Wredenhagen et al. | |
| 2002/0075412 A1 | 6/2002 | Tang et al. | |
| 2002/0101535 A1 * | 8/2002 | Swan | 348/448 |
| 2003/0156301 A1 | 8/2003 | Kempf et al. | |
| 2004/0201777 A1 * | 10/2004 | Zhu et al. | 348/448 |
| 2005/0078214 A1 | 4/2005 | Wong et al. | |
| 2005/0122426 A1 * | 6/2005 | Winger et al. | 348/452 |
| 2005/0219411 A1 * | 10/2005 | Chang | 348/452 |
| 2008/0260021 A1 * | 10/2008 | Sung | 375/240.01 |

FOREIGN PATENT DOCUMENTS

| | | | |
|---|---|---|---|
| EP | 1207693 A2 | 5/2002 | |
| EP | 1515543 A2 | 3/2005 | |
| EP | 1596595 A1 | 11/2005 | |
| JP | 10-322626 | 12/1998 | |

OTHER PUBLICATIONS

ISO/IEC DIS 13818-2 Draft International Standard Information Technology—Generic coding of moving pictures and associated audio information—Part 2 Video, May 10, 1994, pp. 1-1.

A. Murat Tekalp, "Digital Video Processing," Chapter 16—Standards Conversion, pp. 302-330—1995.

European Search Report dated Mar. 28, 2006 for EP Application No. EP04255496, pp. 1-3.

Weinand, Lars, TV-Tuner and Videoschnitt: Ati All-In-Wonder RADEON 8500DV; from Tom's Hardware Guide (online); Dec. 11, 2001, pp. 1-2.

Weinand, Lars, Neue Mainstream-Klasse; Radeon 9000 (RV250), from Tom's Hardware Guide (online), Jul. 18, 2002, pp. 1-6.

Ati Technologies, White Paper Radeon Digital Video, from www.ati.com, Jun. 14, 2000, pp. 1-20.

Yoshida, Junko, Phillips new chip said to remove LCD TV artifacts*; EE Times, Jul. 8, 2003, pp. 1-2, www.eetimes.com/sys/OEG20030708S0017.

Bock, A.M., Motion-adaptive standards conversion between formats of similar field rates, Signal Processing Image Communication, Jul. 31, 1993, pp. 275-280.

Woods, John, W., et al., Hierarchical Motion Compensated De-interlacing; SPIE, Nov. 11, 1991, pp. 805-810.

De Haan, Gerard et al., Deinterlacing—An Overview; IEEE, Sep. 1998, vol. 86, No. 9, pp. 1839-1857.

European Search Report for EP Application No. EP05252564, Aug. 29, 2005.

Martinez, Dennis M. et al.; Spatial Interpolation of Interlaced Television Pictures; IEEE; 1989; pp. 1886-1889.

Bakker, P. et al.; Edge preserving orientation adaptive filtering; IEEE; 1999; pp. 535-540.

Tai, S.C. et al.; A Motion and Edge Adaptive Deinterlacing Algorithm; IEEE Int'l Conf. on Multimedia and Expo; 2004; pp. 659-662.

U.S. Appl. No. 11/467,978, entitled Method and Apparatus for Interpolating Image Information, filed Aug. 29, 2006.

Zhao, M. et al.; Intra-field de-interlacing with advanced up-scaling methods; IEEE 2004; pp. 315-319.

Li, Xin et al.; New Edge-Directed Interpolation; IEEE; vol. 10, No. 10, Oct. 2001; pp. 1521-1527.

Jensen, Kris et al.; Subpixel Edge Localization and the Interpolation of Still Images; IEEE; vol. 4, No. 3; Mar. 1995; pp. 285-295.

Hilman, Kevin et al.; Using Motion-Compensated Frame-Rate Conversion for the Correction of 3:2 Pulldown Artifacts in Video Sequences; IEEE; vol. 10, No. 6, Sep. 2000; pp. 869-877.

* cited by examiner

SINGLE-PASS MOTION ADAPTIVE DEINTERLACER AND METHOD THEREFORE

FIELD OF THE INVENTION

The present disclosure generally relates to image deinterlacing, and more particularly, to motion adaptive image deinterlacing.

BACKGROUND OF THE INVENTION

Computing devices including but not limited to televisions, media players, traditional computer system, mobile devices, etc. are known to support the display of video (and/or graphics) on an associated display. The display may be part of or may be capable of being coupled to the computing device. Video for presentation on a display may be from any suitable source. For example, video may be broadcast by a variety of providers (e.g., from a cable television provider), may be read from any memory (e.g., RAM) or digital storage media (e.g., from a DVD), may be received over the internet from any suitable device thereon (e.g., a web server). As is further recognized, video may be interlaced. That is, the video may be formatted in a sequence of fields where each field is made of pixel values where each field contains half the pixel values for the display screen. For example, a first field may contain the pixel values for all the odd lines of the screen, whereas a second field may contain the pixel values for all of the even lines of the screen. As described in this example, the first field is of odd polarity while the second field is of even polarity. As is recognized, interlaced sequences of fields generally alternate polarity from field to field. When interlaced video is presented to a display capable of drawing the pixels associated with the interlaced video (e.g., a CRT display), the interlaced display sequentially draws one field of image data for every refresh period (i.e., per unit time) while alternating polarity over time.

In displays that are capable of supporting progressive scanning (i.e., displaying a full video frame in a line by line fashion), interlaced video is/may be converted to deinterlaced video, through a process called deinterlacing, such that more information can be presented on the display per unit time for better viewing. As is recognized, deinterlacing is the process of converting interlaced video (a sequence of fields) into a non-interlaced form (a sequence of frames). Deinterlacing may be used as part of an upconversion process to display video information formatted for a standard definition television (SDTV) on a high definition television (HDTV). For example SDTV video signals have 480 interlaced lines per frame (i.e., 480i); a variety of HDTV video signals exist, e.g., 1080i, 720p, etc. where the number indicates the number of lines per frame and the letter "i" indicates it is interlaced (data on every other line) while the letter "p" indicates it is progressive (data on every line). It is recognized that in this process (of video upconversion, e.g., from SDTV to HDTV), deinterlacing is used to first produce an initial frame of image data values before upconverting.

Prior art method for deinterlacing interlaced fields are also known to use motion compensated or motion adaptive techniques. For example, it is known to use a spatial interpolation technique (i.e., a bob) in areas of motion whereas it is known to use a temporal interpolation technique (i.e., a weave) in still areas.

Prior art methods for deinterlacing fields of interlaced video construct a single output frame of deinterlaced video by reading two or more interlaced fields from memory (or from any suitable source). To produce a single output frame for a current field, most prior art methods require reading four fields of interlaced video: (1) the current field, field F; (2) the previous field, field F−1; (3) the next field, field F+1, and (4) the previous, previous field, field F−2. For each pixel in the new frame that corresponds to a pixel location in the current field, F, the current pixel value in the current field, F, is used for the output pixel value. For each missing pixel in the new frame (i.e., each pixel location not associated with the current field, F), the four interlaced fields are examined to determine if motion is detected. If motion is detected, the output pixel value for this location is the result of a spatial interpolation (e.g., a bob). If no motion is detected, the output pixel value for this location is the result of a temporal interpolation, e.g., a weave where, a corresponding pixel value from the adjacent frame, F−1 or F+1, is used for the output pixel value. In this example, four interlaced fields were used to generate one output frame of deinterlaced video. Although there are many variations to this method (e.g., using only two fields to determine motion, etc.), in each case, only one frame is generated for two fields of interlaced video.

For each field of interlaced video read, the same number of memory accesses are required to access the fields. As is recognized, computing devices are often plagued by memory bottlenecks and, thus, prior art deinterlacing methods added to this problem. One solution is to add additional memory bandwidth (i.e., the throughput rate of reading and writing memory data) to systems to reduce this bottleneck effect. However, as is recognized this is an expensive solution.

Accordingly, a need exists for a deinterlacer and method therefore that utilizes less memory accesses and therefore does not have such an adverse effect on the memory bandwidth in computing devices. A similar need exists for a deinterlacer and method therefore that maintains quality in the deinterlaced frames.

BRIEF DESCRIPTION OF THE DRAWINGS

The invention will be more readily understood in view of the following description when accompanied by the below figures and wherein like reference numerals represent like elements.

DETAILED DESCRIPTION

Generally, the present disclosure provides a frame construction engine that constructs a first frame of deinterlaced video and a second frame of deinterlaced video based on a first field of interlaced video and based on a second field of interlaced video, independent of any other fields of interlaced video. In one embodiment, the frame construction engine constructs the first frame of deinterlaced video by assigning pixel values from the first field of interlaced video to corresponding pixel locations in the first frame and by assigning a pixel value from a first field of spatially-interpolated pixel values or from the second field of interlaced video to missing pixel locations in the first frame. Similarly, in one embodiment, the frame construction engine constructs the second frame of deinterlaced video by assigning pixel values from the second field of interlaced video to corresponding pixel locations in the second frame and by assigning a pixel value from a second field of spatially-interpolated pixel values or from the first field of interlaced video to missing pixel locations in the second frame.

By only using two input fields of interlaced video to generate two frames of deinterlaced video, the bandwidth problems of the prior art are mitigated. It is also recognized that the complexity of logic necessary to implement this method and apparatus is not unduly complex and offers good quality.

In the following detailed description, numerous specific details are set forth in order to provide a thorough understanding the present disclosure. It will be apparent to one of ordinary skill in the art, however, that these specific details need not be used to practice the present disclosure. In other instances, well-known structures, interfaces and processes have not been shown or described in detail in order not to unnecessarily obscure the present invention.

Figure 1:
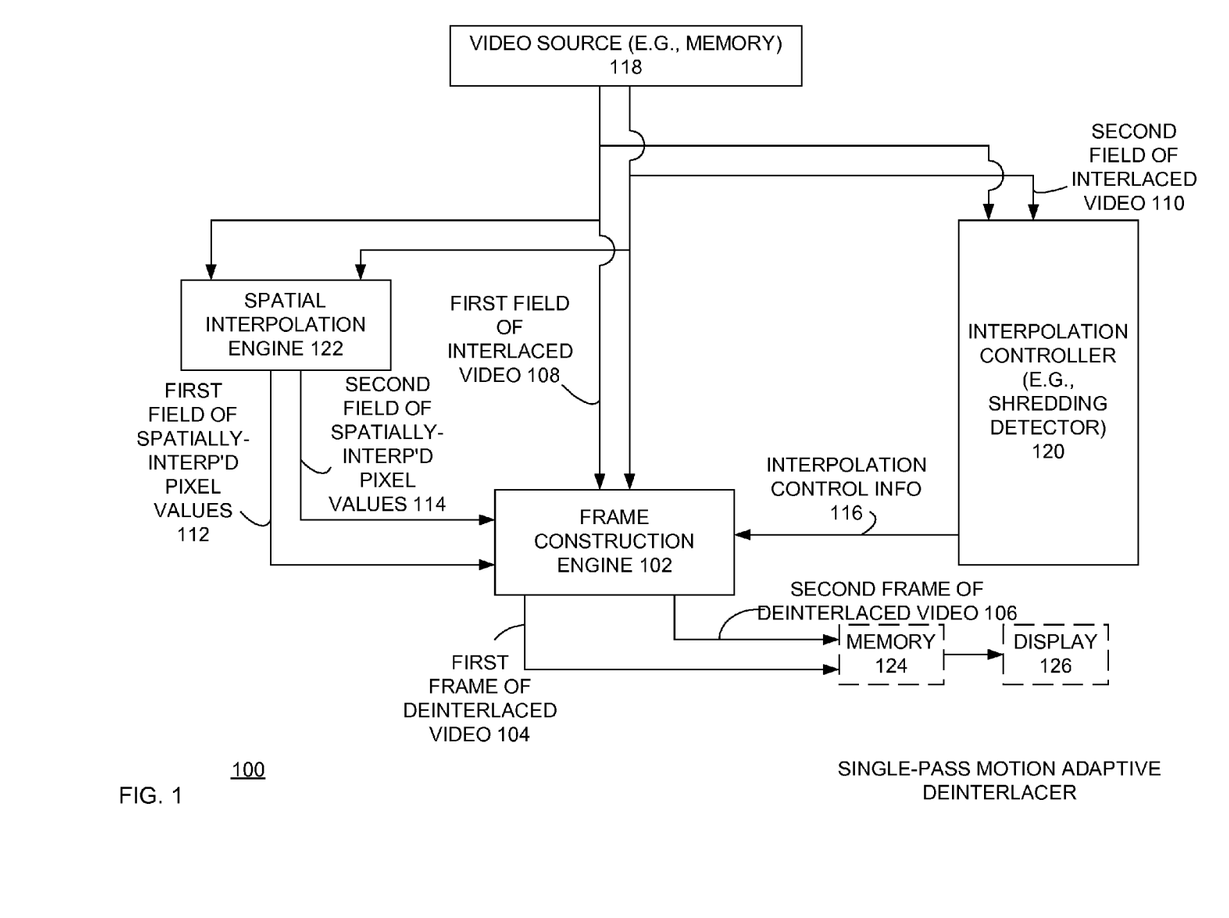
FIG. 1 illustrates a block diagram of an exemplary single pass motion adaptive deinterlacer including a frame construction engine capable of generating a first frame of deinterlaced video and a second frame of deinterlaced video based on a first field of interlaced video and a second field of interlaced video in accordance with one embodiment of the present disclosure.

FIG. 1 illustrates a block diagram of an exemplary single pass motion adaptive deinterlacer 100 including a frame construction engine 102 capable of generating a first frame of deinterlaced video 104 and a second frame of deinterlaced video 106 based on a first field of interlaced video 108 and a second field of interlaced video 110 and independent of any other fields of interlaced video in accordance with one embodiment of the present disclosure. The frame construction engine 102 builds each of the first and second frames of deinterlaced video 104 and 106 based on the first and second fields of interlaced video 108, 110 and based on first and second fields of spatially-interpolated pixel values 112, 114 and in response to interpolation control information 116. Accordingly, the frame construction engine 102 builds each of the first frame of deinterlaced video 104 and the second frame of deinterlaced video 106 based only on two fields of interlaced video: the first field of interlaced video 108 and the second field of interlaced video 110. The frame construction engine 102 therefore produces an output frame of deinterlaced video for each input field of interlaced video.

As illustrated, the first and second fields of interlaced video 108, 110 are output from any suitable video source 118. In one embodiment the first and second fields of interlaced video 108, 100 have opposite polarities; i.e., the first field of interlaced video 108 may have a first polarity (e.g., odd) and the second field of interlaced video 110 may have an opposite polarity (e.g., even). Video source 118 may be, for example, memory (e.g., system memory, RAM, etc.), a cable provider, a digital storage media player (e.g., a DVD player), a serving device on the Internet (e.g., a web server), etc. As recognized, video source 118 may be any suitable provider of video where in real time or delayed (e.g., time shifted as a result of being stored on a recordable medium/memory). However, even where the video source 118 is a live feed, it is recognized that memory is generally still required to at least temporarily buffer at least a portion (e.g., one or more fields) of the live feed. If video source 118 is memory, at least one memory controller (not shown) is needed to access the fields of interlaced video from the video source 118. The memory may be conceptually or physically segmented into separate field buffers. The first and second fields of interlaced video 108, 110 may be stored in memory in one or more "field buffers". Irregardless, the fields 108, 110 may reside at different memory spaces or at the same memory space. If first and second fields of interlaced video 108, 100 have opposite polarities and if fields 108, 110 are stored in the same memory space, fields 108, 100 may be stored in an interleaved fashion where odd field interlaced video occupy odd lines and even field interlaced video occupy even fields, without losing generality.

In one embodiment, the frame construction engine 102 and video source 118 are coupled to an interpolation controller 120. Interpolation controller 120 generates interpolation control information 116 based on the first field of interlaced video 108 and the second field of interlaced video 110 independent of any other fields of interlaced video.

A skilled artisan will recognize that the first and second fields of interlaced video 108, 110 together may represent an woven frame of interlaced video. That is, assuming the first field 108 and second field 110 have opposite polarities, the fields may be conceptually thought of as interleaved or woven frame of the two fields where the odd field interlaced video occupies the odd lines of the woven frame and the even field interlaced video occupy the even lines of the woven frame. In one embodiment, the interpolation controller 120 implements a shredding pattern detection algorithm as a result of being programmed or constituting dedicated hardware to perform the same. Using the shredding pattern detection algorithm, the interpolation controller 120 generates interpolation control information 116 such that it indicates whether a shredding pattern exists within a vicinity of each pixel location in the woven frame.

The shredding pattern detection algorithm, as implemented by the interpolation controller 120, looks for shredding patterns. As recognized by a skilled artisan, a shredding pattern can be detected by identifying, in a given vicinity or region of pixels of the woven frame, that the pixel values from even lines form a relatively uniform pattern (e.g., a flat area, a smooth shade of color), and that the pixel values from odd lines form a relatively uniform pattern, but that the interleaved even and odd lines form a relatively nonuniform pattern (e.g., like the window coverings called blinds). If the woven frame constitutes two adjacent (i.e., consecutive) fields of interlaced video, it is recognized that in motion areas, there will be shredding patterns. However, in still areas, shredding patterns are not usually found unless the still video image has such content (e.g., window blinds).

The shredding pattern detection algorithm, as implemented by the interpolation controller 120, looks for shredding patterns for each pixel location in the woven frame by taking a group of pixel values from the surrounding neighborhood of pixel values in the woven frame. For example, if the pixel location for which the interpolation controller 120 is looking to determine whether a shredding pattern exists is pixel location (2,2), i.e., x=2 and y=2, the interpolation controller 120 may read a group of 11 surrounding pixels. If the woven frame is given the name X, the following pixel values of X may be part of this group of 11 pixels:

X(1,1) X(2,1) X(3,1);
X(1,2) X(2,2) X(3,2);
X(1,3) X(2,3) X(3,3);
X(1,4) X(2,4) X(3,4).

The interpolation controller 120 may then perform any suitable manipulation of these pixel values to determine if a shredding pattern exists in this vicinity. For example, the following formulae may be used to detect if such a shredding pattern exists:

```
a = (X(1,1) + 2*X(2,1) + X(3,1))/4;
b = (X(1,2) + 2*X(2,2) + X(3,2))/4;
c = (X(1,3) + 2*X(2,3) + X(3,3))/4;
d = (X(1,4) + 2*X(2,4) + X(3,4))/4;
e1 = any suitable threshold value (e.g., 3);
e2 = any suitable threshold value (e.g., 5);
if ((abs((a−b)) − (c−d))< e1) && (abs(a−b)>e2) &&(abs(c−d)>e2)) then:
     shredding_pattern = 1;
else
     shredding_pattern = 0;
end if;
```

As is recognized, each of "e1" and "e2" represent any suitable threshold value for the algorithm. In the above example, e1=3 and e2=5. A skilled artisan will recognize that the operator "abs(x−y)" returns the absolute value of the difference of "x" and "y". A skilled artisan will recognize that the operators ">" and "<" represent the logical operator "is greater than" or "is less than". That is, the operation x>y will return a logical one if the operation is true and will return a logical zero if the operation is false. Similarly, a skilled artisan will recognize that the operator "&&" represents the logical operator AND. "Shredding_pattern" represents whether a shredding pattern is detected. A shredding pattern is detected when, for a particular pixel location, Shredding-_pattern=1. A shredding pattern is not detected when this pixel location, Shredding_pattern=0.

It is recognized that any other shredding pattern detecting algorithm or any other suitable algorithm may be substituted for the specific example above. Additionally it is recognized that any suitable group of pixels may be used to determine whether a shredding pattern exists for a particular pixel location in the woven frame. That is, the "vicinity" is not limited to a block of 12 pixels. It is further recognized that by using such an algorithm recursively for each pixel location in the woven frame, a map of "Shredding_pattern" values may be computed. Such a map, using the example above, would be the size of the frame and consist of 1s and 0s, where at each pixel location having a 1, a shredding pattern was detected and at each pixel having a 0, a shredding pattern was not detected. This map of Shredding_pattern values may be one example of interpolation control information 116. However, it is recognized that any other suitable signal, voltages or data may be used to convey the same or similar information.

In one embodiment, the frame construction engine 102 and video source 118 are coupled to a spatial interpolation engine 122. Spatial interpolation engine 122 receives the first and second fields of interlaced video 108, 110 and generates the first field of spatially-interpolated pixel values 112 and the second field of spatially-interpolated pixel values 114. In one embodiment, the first field of spatially-interpolated pixel values 112 is based on the first field of interlaced video 108 independent of any other fields of interlaced video. The first field of spatially-interpolated video 112 represents a field of spatially-interpolated pixel values for each of the missing lines associated with the first field of interlaced video 108. For example, if the first field of interlaced video 108 is an odd field of interlaced video, the first field of spatially-interpolated pixel values 112 represent the pixel values for the missing even lines. Accordingly, in one embodiment, the first field of spatially-interpolated pixel values 112 has the same size as the first field of interlaced video 108. In one embodiment, the second field of spatially-interpolated pixel values 114 is based on the second field of interlaced video 110 independent of any other fields of interlaced video. Similarly, the second field of interpolated pixel values 114 represents a field of spatially-interpolated pixel values for each of the missing lines associated with the second field of interlaced video 110. It is recognized that any suitable spatial interpolation scheme may be utilized. For example a simple "bobbing" interpolation scheme may be adopted to take the average of the pixel value located directly above and below the pixel location of interest.

Returning to frame construction engine 102, the frame construction engine 102 constructs the first frame of deinterlaced video 104 by assigning pixel values from the first field of interlaced video 108 to corresponding pixel locations in the first frame 104. For example, if the first field of interlaced video 108 is a field of odd lines, then the pixel values of first field 108 are associated with the odd lines of the first frame 104. It is recognized that in one embodiment, the size of the first frame 104 will have twice as much data associated therewith as both even and odd lines of the frame are populated with pixel values whereas in a field only one of the even and odd lines are populated. In one embodiment, the frame construction engine 102 identifies missing pixel locations in the first frame 104, either directly or indirectly. These missing pixel locations are the pixel locations that are not associated with a pixel location in the first field of interlaced video 108. Each missing pixel location in the first frame 104 is assigned, in response to the interpolation control information 116, a pixel value from one of: the first field of spatially-interpolated pixel values 112 and the second field of interlaced video 110.

The frame construction engine 102 selects or assigns the pixel value from the first field of spatially-interpolated pixel values 112 when the interpolation control information 116 indicates the detection of a shredding pattern in the vicinity of this pixel location (e.g., Shredding_pattern=1). However, when the interpolation control information 116 indicates no detection of a shredding pattern in the vicinity of this pixel location (e.g., Shredding_pattern=0), then the frame construction engine 102 selects or assigns the pixel value from the second field of interlaced video 110. In one embodiment, regardless of whether the pixel value is selected or assigned from the first field of spatially-interpolated pixel values 112 or from the second field of interlaced video 110, the pixel value selected from the appropriate field corresponds to the pixel location of the missing pixel location in the first frame 104. For example, each pixel location for each pixel value in the first field of spatially-interpolated pixel values 112 is associated with a corresponding missing pixel location in the first frame of deinterlaced video 104. In this manner, the interpolation control information 116 tells the frame construction engine 102 to build the first frame 104 using the first frame of interlaced video 108 and to select between a spatially-interpolated pixel value (e.g., from the first field of spatially-interpolated pixel values 114) and temporally-interpolated pixel value (e.g., from the second field of interpolated pixel values 110). As is recognized, the first frame 104 is constructed based on the first field of interlaced video 108 and the second field of interlaced video 110 independent of any other fields of interlaced video.

The frame construction engine 102, in one embodiment, also constructs the second frame of deinterlaced video 106 by assigning pixel values from the second field of interlaced video 110 to corresponding pixel locations in the second frame 106. For example, if the second field of interlaced video 110 is a field of even lines, then the pixel values of second field 110 are associated with the even lines of the second frame 106. It is recognized that in one embodiment, the size of the second frame 106 will have twice as much data associated therewith as both even and odd lines of the frame are populated with pixel values whereas in a field only one of the even and odd lines are populated. In one embodiment, the frame construction engine 102 identifies missing pixel locations in the second frame 106, either directly or indirectly. These missing pixel locations are the pixel locations that are not associated with a pixel location in the second field of interlaced video 110. Each missing pixel location in the second frame 106 is assigned, in response to the interpolation control information 116, a pixel value from one of: the second field of spatially-interpolated pixel values 114 and the first field of interlaced video 108.

The frame construction engine 102 selects or assigns the pixel value from the second field of spatially-interpolated pixel values 114 when the interpolation control information 116 indicates the detection of a shredding pattern in the vicinity of this pixel location (e.g., Shredding_pattern=1). However, when the interpolation control information 116 indicates no detection of a shredding pattern in the vicinity of this pixel location (e.g., Shredding_pattern=0), then the frame construction engine 102 selects or assigns the pixel value from the first field of interlaced video 108. In one embodiment, irregardless of whether the pixel value is selected or assigned from the second field of spatially-interpolated pixel values 114 or from the first field of interlaced video 112, the pixel value selected from the appropriate field corresponds to the pixel location of the missing pixel location in the second frame 106. For example, each pixel location for each pixel value in the second field of spatially-interpolated pixel values 114 is associated with a corresponding missing pixel location in the second frame of deinterlaced video 106. In this manner, the interpolation control information 116 tells the frame construction engine 102 to build the second frame 104 using the second frame of interlaced video 110 and to select between a spatially-interpolated pixel value (e.g., from the second field of spatially-interpolated pixel values 114) and temporally-interpolated pixel value (e.g., from the first field of interpolated pixel values 108). As is recognized, the second frame 106 is constructed based on the second field of interlaced video 110 and the first field of interlaced video 108 independent of any other fields of interlaced video.

As is recognized, the first frame 104 and the second frame 106 are generated, in one embodiment, based on the first and second fields 108, 110 independent of any other fields of interlaced video (e.g., from video source). This constitutes a single-pass motion adaptive deinterlacer. It is a single pass because two frames are constructed from two fields. It is motion adaptive because the interpolation control information takes into account the motion in the woven frame. As compared to the prior art where only one frame was generated for every two or four fields of interlaced video, the memory bandwidth is reduced in systems where video source 118 is memory.

As further illustrated in FIG. 1, frame construction engine 102 may be coupled to one or more of memory 124 and a display 126. Memory 124 may be any suitable memory as described above and, in one embodiment, constitutes a frame buffer, as is known in the art. In another embodiment, memory 124 is any suitable memory wherein the first and second frames 104, 106 are subsequently processed by other logic (not shown) such as, but not limited to one or more processors or hardware components. The frame construction engine 102 may also be coupled to display 126 for display of the frames 104, 106.

Each of the frame construction engine 102, the spatial interpolation engine 122, the interpolation controller 120 and the video source 116 may be implemented as or on one or more integrated circuits and may individually or in combination constitute or be a part of a processor, a processing core of a processor, a digital signal processor, an application specific integrated circuit, or any other suitable device. A skilled artisan recognizes that each of the he frame construction engine 102, the spatial interpolation engine 122 and the interpolation controller 120 may further be programmable or not-programmable. If programmable, a skilled artisan recognizes that each of the frame construction engine 102, the spatial interpolation engine 122, and the interpolation controller 120 may contain memory or be associated with memory containing executable instructions, such that when executed by the frame construction engine 102, the spatial interpolation engine 122, and the interpolation controller 120, the frame construction engine 102, the spatial interpolation engine 122, and the interpolation controller 120 implement the instructions to perform as described herein. As used herein, memory may include one or more integrated circuit or circuits, one or more device or devices, or any suitable component of any of the above elements of FIG. 1. The memory may be volatile or non-volatile and may, for example, be RAM, ROM, CD-ROM, DVD-ROM, or flash memory, etc. It is further recognized that each of the fields 108-114, frames 104-106 and information 116 may be conveyed between the appropriate engines or controllers using any suitable transmission path (wired or wireless) and that each may take the form of any suitable signal, voltage or indicator, as is known in the art.

Figure 2:
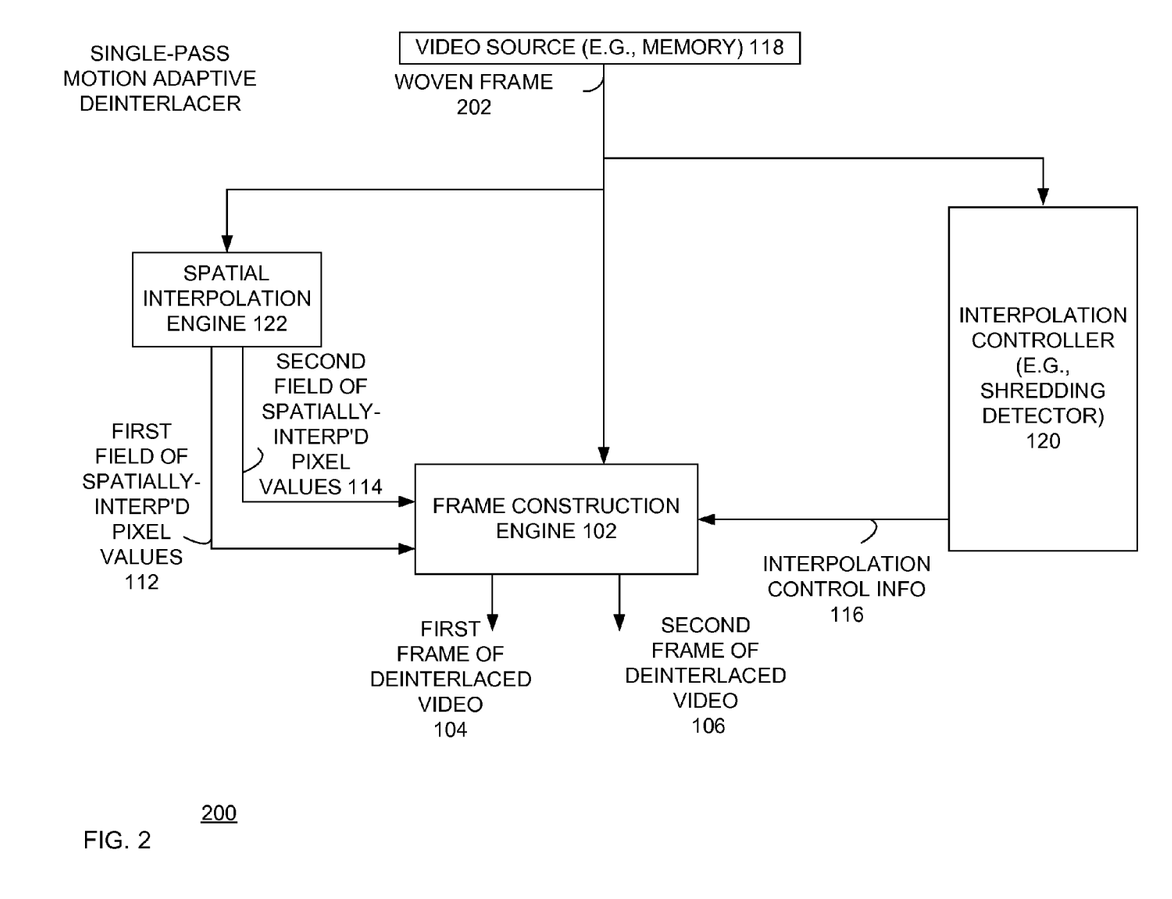
FIG. 2 illustrates a block diagram of a another exemplary single pass motion adaptive deinterlacer including a frame construction engine capable of generating a first frame of deinterlaced video and a second frame of deinterlaced video based on a woven frame of interlaced video in accordance with another embodiment of the present disclosure.

FIG. 2 illustrates a block diagram of a another exemplary single-pass motion adaptive deinterlacer 200 including the frame construction engine 102 capable of generating the first frame of deinterlaced video 104 and the second frame of deinterlaced video 106 based on a woven frame of interlaced video 202 in accordance with another embodiment of the present disclosure. The single-pass motion adaptive deinterlacer 200 may include in one or more different embodiments one or both of the spatial interpolator 122 and the interpolation controller 120. The generation of the first and second fields of spatially-interpolated pixel values 112, 114, the generation of the interpolation control information 116, and the generation of the first and second frames of deinterlaced video 104, 106 are analogous to that described with reference to FIG. 1. However, instead of receiving first and second fields of interlaced video 108, 110, a memory controller accesses woven frame 202 which is a physical frame having the pixel values associated with the first field of interlaced video 108 and pixel values associated with the second field of interlaced video 110. It is also recognized that each of the spatial interpolation engine 122, the frame construction engine 102 and the interpolation controller 120 may be appropriately modified to operate on the woven frame level or to break the woven frame into its component parts. As appreciated, in this embodiment, the number of memory accesses if reduced by one while retaining all the other benefits of the single-pass motion adaptive deinterlacer 100 of FIG. 1.

Figures 3, 4:
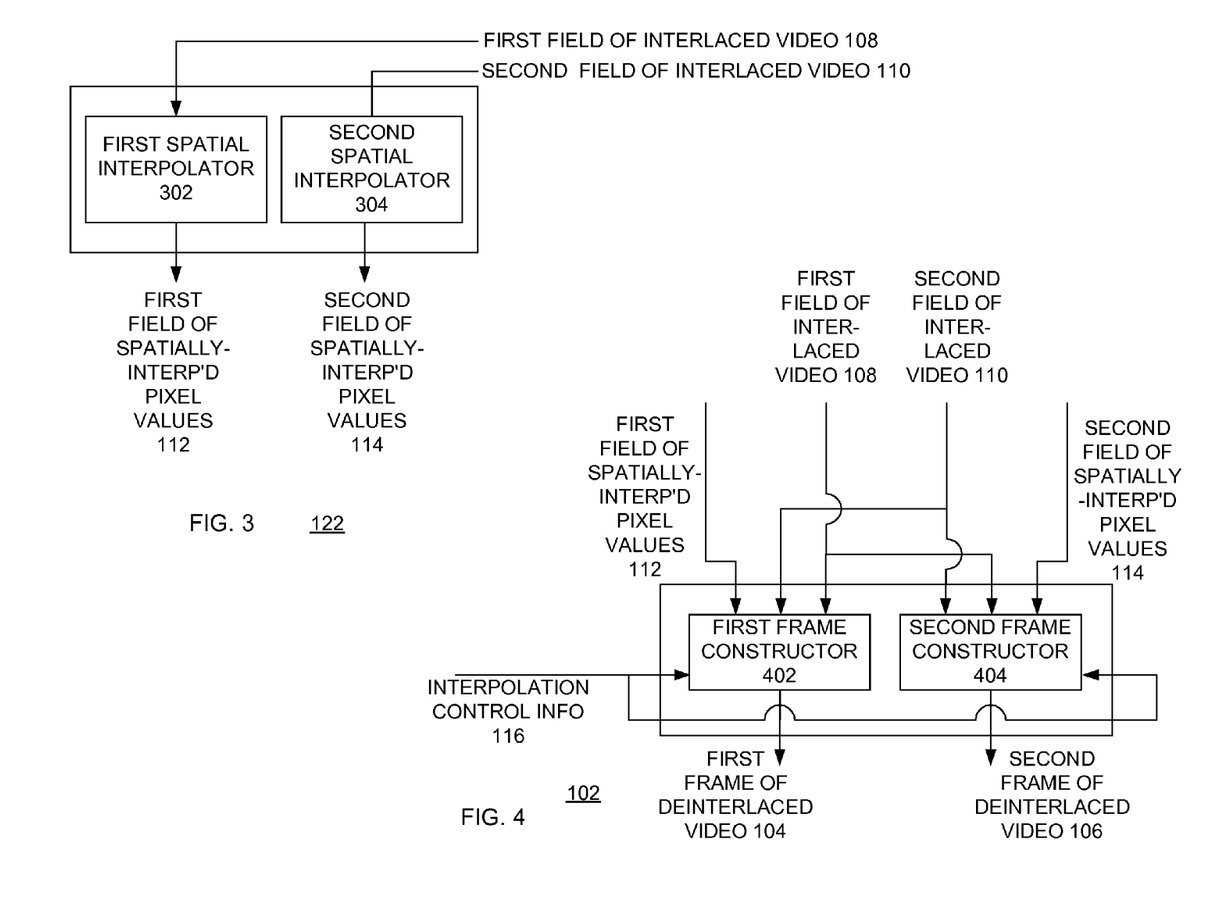
FIG. 3 illustrates a block diagram of an exemplary spatial interpolation engine in accordance with either FIG. 1 or FIG. 2 and in accordance with one embodiment of the present disclosure.
FIG. 4 illustrates a block diagram of an exemplary frame construction engine in accordance with either FIG. 1 or FIG. 2 and in accordance with one embodiment of the present disclosure.

FIG. 3 illustrates a block diagram of an exemplary spatial interpolation engine 122 in accordance with either FIG. 1 or FIG. 2 and in accordance with one embodiment of the present disclosure. Spatial interpolation engine 122 includes first and second spatial interpolators 302 and 304 that are dedicated to respectively generating the first field of spatially-interpolated pixel values 112 based on the first field of interlaced video 108 and generating the second field of spatially-interpolated pixel values 114 based on the second field of interlaced video 110. The spatial interpolation schemes used by each of the first and second spatial interpolators 302, 304 may be the same or different, and in one embodiment is the simple bob interpolation as described above. Any other spatial interpolation scheme may also be used.

FIG. 4 illustrates a block diagram of an exemplary frame construction engine 102 in accordance with either FIG. 1 or FIG. 2 and in accordance with one embodiment of the present disclosure. Frame construction engine 102 includes first and second frame constructors 402, 404 that are dedicated to respectively generating the first frame of deinterlaced video 104 and the second frame of deinterlaced video 106 using the techniques described above. As illustrated, first frame of deinterlaced video 104 is constructed using the first field of interlaced video 108 and at least one of the second field of interlaced video 110 and first field of spatially-interpolated pixel values 112 as selected by interpolation control information 116. Similarly, second frame of deinterlaced video 106 is constructed using the second field of interlaced video 110 and at least one of the first field of interlaced video 108 and second field of spatially-interpolated pixel values 114 as selected by interpolation control information 116. In one embodiment, the interpolation control information 116 may be two separate signals or maps of information to control these selections. As recognized, the interpolation controller 120 therefore may be designed to detect whether a shredding pattern exists within the vicinity of each pixel location in the woven frame of interlaced video that corresponds to a missing pixel location in the first frame 104 (when the first frame constructor 402 is constructing the first frame of deinterlaced video 104) and may also be designed to detect whether a shredding pattern exists within the vicinity of each pixel location in the woven frame of interlaced video that corresponds to a missing pixel location in the second frame 106 (when the second frame constructor 404 is constructing the second frame of deinterlaced video 106).

Figure 5:
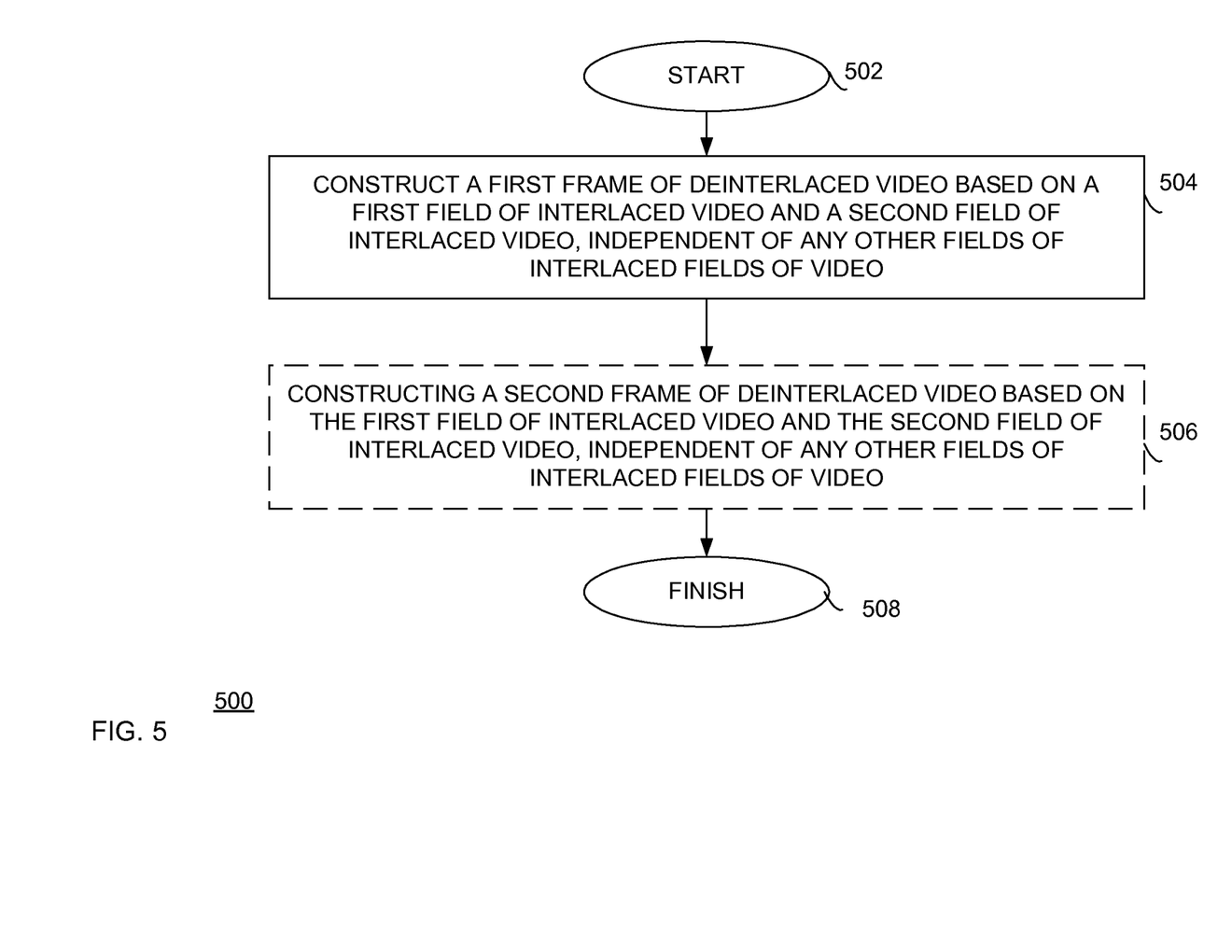
FIG. 5 illustrates an exemplary flow chart for a method of single-pass motion adaptive deinterlacing in accordance with one embodiment of the present disclosure.

FIG. 5 illustrates an exemplary flow chart 500 for a method of single-pass motion adaptive deinterlacing in accordance with one embodiment of the present disclosure. The method starts in block 502 where, for example, a sequence (i.e., two or more) fields of interlaced video are received. In one embodiment, this may correspond to receiving the interlaced video from any suitable video source such as video source 118. The method continues in block 504 where a first frame of deinterlaced video is constructed based on a first field of interlaced video and a second field of interlaced video, independent of any other fields of interlaced video. Next, the method includes block 506 where a second field of deinterlaced video is constructed based on the first field of interlaced video and the second field of interlaced video also independent of any other interlaced fields of video. In one embodiment, the method of blocks 504 and 506 may be implemented using the frame construction engine 102, the spatial interpolation engine 122 and the interpolation controller 120 of FIGS. 1-4 as discussed above. Finally, the method ends in block 508 where, for example, the first and second frames of deinterlaced video are stored in any suitable memory.

Figure 6:
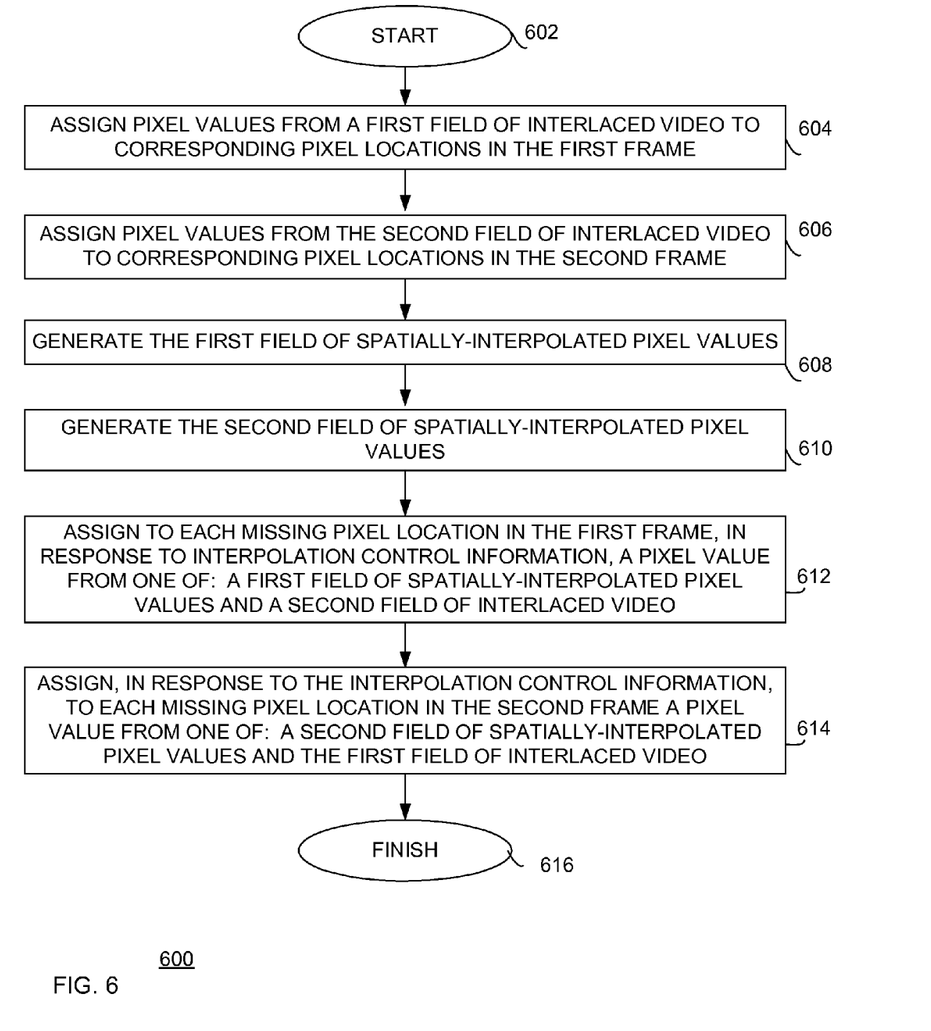
FIG. 6 illustrates another exemplary flow chart for another method of single-pass motion adaptive deinterlacing in accordance with one embodiment of the present disclosure.

FIG. 6 illustrates another exemplary flow chart for another method of single-pass motion adaptive deinterlacing in accordance with one embodiment of the present disclosure. The method begins in block 602 which may be, for example, the same as block 502. Next the method includes block 604 where pixel values from a first field of interlaced video are assigned to corresponding pixel locations in the first frame. The method also includes block 606 where pixel values from a second field of interlaced video are assigned to corresponding pixel locations in the second frame. In one embodiment, this may be implemented or performed using the frame construction engine 102 as described above. Next, the method includes the method of block 608 and block 610 where first and second fields of spatially-interpolated pixel values are generated. In one embodiment, the spatial interpolation engine 122 of FIGS. 1-3 may be used to perform this method. Next, the method includes block 612 where each missing pixel location in the first frame is assigned a pixel value from one of: a first field of spatially-interpolated pixel values and a second field of interlaced video, in response to interpolation control information. The method also includes block 614 where each missing pixel location in the second frame is assigned a pixel value from one of: a second field of spatially-interpolated pixel values and a first field of interlaced video, in response to interpolation control information. In one embodiment, this may be implemented using the interpolation controller 120 and frame construction engine 102 of FIGS. 1-2, and 4 and as otherwise provided above.

Among other advantages, the above method and apparatus enables motion adaptive deinterlacing where two frames of deinterlaced video are generated or constructed for every two fields of interlaced video. Accordingly, the memory bandwidth problems in the prior art are mitigated using the more efficient method and apparatus described herein. Other advantages will be recognized by one of ordinary skill in the art. It will also be recognized that the above description describes mere examples and that other embodiments are envisioned and covered by the appended claims.

For example, it is recognized that fields such as first and second fields of video data 108, 110 may be considered to have missing pixel locations. As contemplated, each of the first and second field of interlaced video 108, 110 have missing pixel locations at those locations that would otherwise be present or populated with a pixel value if each of the first and second fields of interlaced video 108, 110, respectively, were frames of interlaced video. Based on this understanding of missing pixel locations of the first and second fields of video data 108, 110, the frame construction engine 102, in an alternate embodiment, may construct the first frame of deinterlaced video 104 by inserting into the first field of interlaced video 108 for each missing pixel location of the first field of video data 108, a pixel value from one of: a first field of spatially-interpolated pixel values 112 and the second field of interlaced video 114. In one embodiment, this may be done in response to interpolation control information 116. Similarly, frame construction engine 102 may construct the second frame of deinterlaced video 106 by inserting into the second field of interlaced video 110 for each missing pixel location of the first field of video data 108, a pixel value from one of: a second field of spatially-interpolated pixel values 114 and the first field of interlaced video 108. In one embodiment, this may be done in response to interpolation control information 116. It is therefore contemplated that the present invention cover any and all modifications, variations or equivalents that fall within the spirit and scope of the basic underlying principles disclosed above and claimed herein.

What is claimed is:

1. An integrated circuit comprising:
  a frame construction engine operative to construct both a first frame of deinterlaced video and a second frame of deinterlaced video, constructing of the first frame of deinterlaced video including examining and using both of a first field of interlaced video and a second field of interlaced video, independent of any other fields of interlaced video, constructing of the second frame of deinterlaced video including examining and using both of the first field of interlaced video and the second field of interlaced video, independent of any other fields of interlaced video, the frame construction engine being further operative to construct the first frame of deinterlaced video by:
assigning pixel values from the first field of interlaced video to corresponding pixel locations in the first frame; and
assigning to each missing pixel location in the first frame, in response to interpolation control information, a pixel value from one of: a first field of spatially-interpolated pixel values and the second field of interlaced video, the frame construction engine being further operative to construct the second frame of deinterlaced video by:
assigning pixel values from the second field of interlaced video to corresponding pixel locations in the second frame; and
assigning, in response to the interpolation control information, to each missing pixel location in the second frame a pixel value from one of: a second field of spatially-interpolated pixel values and the first field of interlaced video, the interpolation control information is based on the first field of interlaced video and the second field of interlaced video independent of any other fields of interlaced video, the first and second fields of spatially-interpolated pixel values are respectively based on the first and second fields of interlaced video independent of any other fields of interlaced video, and the missing pixel locations in the first and second frames respectively represent pixel locations in the first and second frames that are respectively not associated with a pixel location in the first and second fields of interlaced video;

the circuit further comprising an interpolation controller operative to generate the interpolation control information, and wherein the first field of interlaced video and the second field of interlaced video together represent a woven frame of interlaced video, the interpolation controller is operative to implement a shredding pattern detection algorithm such that the interpolation control information indicates whether a shredding pattern exists within a vicinity of each pixel location in the woven frame that corresponds to a missing pixel location in the first frame, when the shredding pattern is detected in the vicinity of a first pixel location in the woven frame corresponding to a first missing pixel location in the first frame, the frame construction engine is operative to assign the pixel value from the first field of spatially-interpolated pixel values to the first missing pixel location in the first frame, and when the shredding pattern is not detected in the vicinity of the first pixel location in the woven frame corresponding to a first missing pixel location in the first frame, the frame buffer is operative to assign the pixel value from the second field of interlaced video to the first missing pixel location in the first frame.

2. The integrated circuit of claim 1, wherein:
each of the first and second field of interlaced video have missing pixel locations, wherein the missing pixel locations of each of the first and second fields of interlaced video represent pixel locations that would be present if each of the first and second fields of interlaced video, respectively, were frames of interlaced video;

the frame construction engine is operative to construct the first frame of deinterlaced video by inserting into the first field of interlaced video for each missing pixel location of the first field of video data, a pixel value from one of: a first field of spatially-interpolated pixel values and the second field of interlaced video, the frame construction engine is further operative to construct the second frame of deinterlaced video by inserting into the second field of interlaced video for each missing pixel location of the second field of video data, a pixel value from one of: a second field of spatially-interpolated pixel values and the first field of interlaced video, and the first and second fields of spatially-interpolated pixel values are respectively based on the first and second fields of interlaced video independent of any other fields of interlaced video.

3. The integrated circuit of claim 1, further comprising a spatial interpolation engine operative to generate:
the first field of spatially-interpolated pixel values; and
the second field of spatially-interpolated pixel values.

4. The integrated circuit of claim 3, wherein:
each pixel location for each pixel value in the first field of spatially-interpolated pixel values is associated with a corresponding missing pixel location in the first frame, and
each pixel location for each pixel value in the second field of spatially-interpolated pixel values is associated with a corresponding missing pixel locations in the second frame.

5. The integrated circuit of claim 1, wherein:
the frame construction engine is further operative to construct a second frame of deinterlaced video by:
assigning pixel values from the second field of interlaced video to corresponding pixel locations in the second frame;
identifying missing pixel locations in the second frame as pixel locations in the second frame that are not associated with a pixel location in the second field of interlaced video; and
assigning, in response to the interpolation control information, to each missing pixel location in the second frame a pixel value from one of: a second field of spatially-interpolated pixel values and the first field of interlaced video, and the interpolation control information further indicates whether a shredding pattern exists within a vicinity of each pixel location in the woven frame of interlaced video that corresponds to a missing pixel location in the second frame, wherein:
when the shredding pattern is detected in the vicinity of a second pixel location in the woven frame corresponding to a second missing pixel location in the second frame, the frame construction engine is operative to assign the pixel value from the second field of spatially-interpolated pixel values to the second missing pixel location in the second frame, and
when the shredding pattern is not detected in the vicinity of the second pixel location in the woven frame corresponding to a second missing pixel location in the second frame, the frame buffer is operative to assign the pixel value from the first field of interlaced video to the second missing pixel location in the second frame.

6. The integrated circuit of claim 1, wherein the frame construction engine comprises:
a first frame constructor operatively coupled to receive the first field of interlaced video, the second field of interlaced video and the first field of spatially-interpolated pixel values and is operative to construct the first frame of deinterlaced video, and
a second frame constructor operatively coupled to receive the first field of interlaced video, the second field of interlaced video and the second field of spatially-interpolated pixel values and is operative to construct the second frame of deinterlaced video.

7. The integrated circuit of claim 3, wherein the spatial interpolation engine comprises:
a first spatial interpolator operative to generate the first field of spatially-interpolated pixel values; and
a second spatial interpolator operative to generate the second field of spatially-interpolated pixel values.

8. The integrated circuit of claim 1, further comprising memory operatively capable of storing the first field of interlaced video and the second field of interlaced video.

9. The integrated circuit of claim 1, wherein:
the frame construction engine is operatively coupled to at least one of: memory and a display,
the memory is operatively capable of storing the first frame of deinterlaced video and the second frame of deinterlaced video, and
the display is operatively capable of displaying the first frame of deinterlaced video and the second frame of deinterlaced video.

10. A method for deinterlacing fields of interlaced video comprising:
generating the interpolation control information;
constructing a first frame of deinterlaced video by examining and using both of a first field of interlaced video and a second field of interlaced video, independent of any other fields of interlaced fields of video; constructing the first frame of deinterlaced video comprises:
assigning pixel values from the first field of interlaced video to corresponding pixel locations in the first frame; and
assigning to each missing pixel location in the first frame, in response to interpolation control information, a pixel value from one of: a first field of spatially-interpolated pixel values and the second field of interlaced video,
constructing a second frame of deinterlaced video by examining the first field of interlaced video and the second field of interlaced video, independent of any other fields of interlaced fields of video, constructing the second frame of deinterlaced video comprises:
assigning pixel values from the second field of interlaced video to corresponding pixel locations in the second frame; and
assigning, in response to the interpolation control information, to each missing pixel location in the second frame a pixel value from one of: a second field of spatially-interpolated pixel values and the first field of interlaced video;
the interpolation control information is based on the first field of interlaced video and the second field of interlaced video independent of any other fields of interlaced video,
the first and second fields of spatially-interpolated pixel values are respectively based on the first and second fields of interlaced video independent of any other fields of interlaced video, and
the missing pixel locations in the first and second frames respectively represent pixel locations in the first and second frames that are respectively not associated with a pixel location in the first and second fields of interlaced video
the first field of interlaced video and the second field of interlaced together represent a woven frame of interlaced video,
generating the interpolation control information comprises implementing a shredding pattern detection algorithm such that the interpolation control information indicates whether a shredding pattern exists within a vicinity of each pixel location in the woven frame that corresponds to a missing pixel location in the first frame, and
the method further comprises:
assigning the pixel value from the first field of spatially-interpolated pixel values to a first missing pixel location in the first frame when the shredding pattern is detected in the vicinity of a first location in the woven frame corresponding to the first missing pixel location in the first frame, and
assigning the pixel value from the second field of interlaced video to the first missing pixel location in the first frame when the shredding pattern is not detected in the vicinity of the first pixel location in the woven frame corresponding to the first missing pixel location in the first frame.

11. The method of claim 10, further comprising:
generating the first field of spatially-interpolated pixel values; and
generating the second field of spatially-interpolated pixel values.

12. The method of claim 11, wherein:
each pixel location for each pixel value in the first field of spatially-interpolated pixel values is associated with a corresponding missing pixel location in the first frame, and
each pixel location for each pixel value in the second field of spatially-interpolated pixel values is associated with a corresponding missing pixel location in the second frame.

13. The method of claim 12, further comprising:
constructing a second frame of deinterlaced video by:
assigning pixel values from the second field of interlaced video to corresponding pixel locations in the second frame;
identifying missing pixel locations in the second frame as pixel locations in the second frame that are not associated with a pixel location in the second field of interlaced video; and
assigning, in response to the interpolation control information, to each missing pixel location in the second frame a pixel value from one of: a second field of spatially-interpolated pixel values and the first field of interlaced video,
wherein:
the interpolation control information further indicates whether a shredding pattern exists within a vicinity of each pixel location in the woven frame of interlaced video that corresponds to a missing pixel location in the second frame,
assigning the pixel value from the second field of spatially-interpolated pixel values to a second missing pixel location in the second frame when the shredding pattern is detected in the vicinity of a second pixel location in the woven frame corresponding to the second missing pixel location in the second frame, and assigning the pixel value from the first field of interlaced video to the second missing pixel location in the second frame when the shredding pattern is not detected in the vicinity of the second pixel location in the woven frame corresponding to the second missing pixel location in the second frame.

14. The method of claim 10, further comprising at least one of:

storing the first frame of deinterlaced video and the second frame of deinterlaced video, and displaying the first frame of deinterlaced video and the second frame of deinterlaced video.

15. A device comprising:

a frame construction engine operative to construct both a first frame of deinterlaced video and a second frame of deinterlaced video, wherein the first frame is constructed by:

assigning pixel values from a first field of interlaced video to corresponding pixel locations in the first frame, and assigning to each missing pixel location in the first frame, in response to interpolation control information, a pixel value from one of: a first field of spatially-interpolated pixel values and a second field of interlaced video, wherein the second frame is constructed by:

assigning pixel values from the second field of interlaced video to corresponding pixel locations in the second frame; and assigning, in response to the interpolation control information, to each missing pixel location in the second frame a pixel value from one of: a second field of spatially-interpolated pixel values and the first field of interlaced video, a spatial interpolation engine operative to generate both the first and second fields of spatially-interpolated pixel values respectively based on both the first and second fields of interlaced video independent of any other fields of interlaced video;

an interpolation controller operative to generate the interpolation control information based on both the first field of interlaced video and the second field of interlaced video independent of any other fields of interlaced video, wherein:

the missing pixel locations in both the first and second frames respectively represent pixel locations in both the first and second frames that are respectively not associated with a pixel location in both the first and second fields of interlaced video;

both the first field of interlaced video and the second field of interlaced video together represent a woven frame of interlaced video, the interpolation controller is operative to implement a shredding pattern detection algorithm such that the interpolation control information indicates whether a shredding pattern exists within a vicinity of each pixel location in the woven frame that corresponds to a missing pixel location in the first frame, when the shredding pattern is detected in the vicinity of a first pixel location in the woven frame corresponding to a first missing pixel location in the first frame, the frame construction engine is operative to assign the pixel value from the first field of spatially-interpolated pixel values to the first missing pixel location in the first frame, and when the shredding pattern is not detected in the vicinity of the first pixel location in the woven frame corresponding to a first missing pixel location in the first frame, the frame buffer is operative to assign the pixel value from the second field of interlaced video to the first missing pixel location in the first frame.

* * * * *